(12) United States Patent
Wang et al.

(10) Patent No.: US 8,593,013 B2
(45) Date of Patent: Nov. 26, 2013

(54) SWITCHING CONTROL METHOD CAPABLE OF CONTINUOUSLY PROVIDING POWER AND RELATED APPARATUS AND POWER SUPPLY SYSTEM

(75) Inventors: Sih-Ting Wang, Kaohsiung County (TW); Chiao-Wei Hsiao, Taichung (TW); Chung-Wen Wu, Yilan County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 443 days.

(21) Appl. No.: 12/489,443

(22) Filed: Jun. 23, 2009

(65) Prior Publication Data

US 2010/0259106 A1    Oct. 14, 2010

(30) Foreign Application Priority Data

Apr. 14, 2009    (TW) ................................ 98112307 A

(51) Int. Cl.
*H02J 4/00*    (2006.01)
(52) U.S. Cl.
USPC ............................................. 307/80; 307/43
(58) Field of Classification Search
USPC ..................................................... 307/43, 80
See application file for complete search history.

(56) References Cited

U.S. PATENT DOCUMENTS

| 6,259,171 | B1* | 7/2001 | Cheng | 307/85 |
|---|---|---|---|---|
| 6,960,843 | B2* | 11/2005 | Yamamoto | 307/86 |
| 7,269,447 | B2* | 9/2007 | Yamatani | 455/574 |
| 7,385,374 | B2* | 6/2008 | Frantz et al. | 320/138 |
| 7,701,089 | B2* | 4/2010 | Shimizu | 307/80 |
| 7,709,975 | B2* | 5/2010 | Kuo | 307/80 |
| 2007/0035183 | A1 | 2/2007 | Shimizu | |
| 2009/0189450 | A1* | 7/2009 | Deng | 307/64 |

FOREIGN PATENT DOCUMENTS

TW    323410    12/1997
TW    I297237    5/2008

* cited by examiner

*Primary Examiner* — Fritz M Fleming
(74) *Attorney, Agent, or Firm* — Winston Hsu; Scott Margo

(57) ABSTRACT

A switching control method capable of continuously providing power is utilized for a power supply system having a first power supply unit and a second power supply unit. The switching control method includes generating a first input signal and a second input signal; performing a logical operation process on the first input signal and the second input signal to generate a first control signal; delaying the second input signal for a delay time to generate a second control signal; controlling a coupling relationship between the first power supply unit and a load according to the first control signal; and controlling a coupling relationship between the second power supply unit and the load according to the second control signal.

38 Claims, 10 Drawing Sheets

SWITCHING CONTROL METHOD CAPABLE OF CONTINUOUSLY PROVIDING POWER AND RELATED APPARATUS AND POWER SUPPLY SYSTEM

BACKGROUND OF THE INVENTION

1. Field of the Invention

The present invention relates to a switching control method, and a related apparatus and a power supply system, and more particularly, to a switching control method capable of continuously providing power, and an apparatus and power supply system thereof.

2. Description of the Prior Art

With the development of electronic technology, electronic products become more diverse and more delicate, not to mention incorporating more powerful functions. As a result, more highly effective circuit designs must be implemented. Therefore, in order to meet demands for electronic products, not only power saving but also high quality power supply issues must be taken into consideration in power design.

In the aspect of smart power, i.e. power usage in different stages, a system designer should supply different levels of power. More specifically, according to the system requirements, different types of power supply should be provided for any component in need, which often necessitates the use of switches. The switches can be used for proving a correct power at a proper timing. For example, in the prior art, electronic products take advantage of oscillators. For accuracy, a stable and pure power supply is always needed when the oscillator operates. Otherwise, any subtle voltage variation could result in a non-ideal result. In this situation, the prior art usually uses a low drop out (LDO) regulator as an appropriate power supply, which has low output noise, low output ripples and low electromagnetic interference. However, compared with general power supplies, the LDO regulator has disadvantages of power consumption and low power conversion factor due to an extra current that is required. Thus, if the LDO regulator is used in the whole process for power supply, inevitably, the cost increases. Moreover, when the system operates in an initial state or a reset state, the oscillator does not require high quality for the power supply as much as it does when the system is operating. Thus, the switches are used for properly switching to a stable power supply when the components are operating or switching to a general power supply when the system operates in the initial state or the reset state.

Please refer to FIG. 1, which is a schematic diagram of a power switching device 10 according to the prior art. The power switching device 10 is used for controlling a power supply 102 or an LDO regulator 104 according to a switching control signal S of one bit to provide power to an oscillator 106. The power supply 102 and the LDO regulator 104 are used for providing a supplying power $V_{MM}$ and a stable voltage power $V_{REG}$. When the oscillator 106 is operating, the power switching device 10 controls the LDO regulator 104 to provide a stable voltage power $V_{REG}$ to the oscillator 106. In this situation, the LDO regulator 104 consumes a larger current, but outputs a stable voltage of 1.8 volt. In the initial state or the reset state, for power saving, the power switching device 10 controls the power supply 102 to provide the supplying power $V_{MM}$. Compared with the LDO regulator 104, the voltage provided by the power supply 102 is not stable enough, but is sufficient to provide the current for the oscillator 106. The power switching device 10 includes a first switch 108, a second switch 110 and an inverter 112. An input terminal of the inverter 112 is coupled to the first switch 108. An output terminal of the inverter 112 is coupled to the second switch 110. The first switch 108 controls whether a coupling between the power supply device and the oscillator 106 is conductive or not, according to an inverted signal $S_{INV}$ of the switching control signal S. The second switch 110 controls whether the coupling between the LDO regulator 104 and the oscillator 106 is conductive or not, according to the switching control signal S. As a result, when the oscillator 106 is operating, the second switch 110 can conduct the coupling between the LDO regulator 104 and the oscillator 106 by inputting the switching control signal S with a high voltage level (i.e. S=1), to provide the stable voltage power $V_{REG}$ to the oscillator 106. When the system operates in the initial state or the reset state, the switching control signal S with a low voltage level (i.e. S=0) is inputted. The first switch 108 conducts the coupling between the power supply 102 and the oscillator 106 according to the inverted signal $S_{INV}$ (i.e. $S_{INV}=1$) to provide the supplying power $V_{MM}$ to the oscillator 106.

Please refer to FIG. 2, which illustrates timing diagrams of related signals shown in FIG. 1. Since the switching control signal is delayed for a delay time $T_{INT}$ when inverted by inverter 112, the first switch 108 and the second switch 110 will close all powers during switching. To take an example of time T1 shown in FIG. 2, when the switching control signal S goes from high to low, the LDO regulator 104 or the power supply 102 is disabled during the time that the switching control signal S is inverted by the inverter 112. In other words, power outage could occur.

To avoid the problem caused by inverter delay mentioned above, another method is adopted in the prior art. Please refer to FIG. 3, which is a schematic diagram of a power switching device 30 according to the prior art. The power switching device 30 includes a first switch 302 and the second switch 304. When the switching control signals S1 and S2 are both low (i.e. S1=0, S2=0), the system or the control switching device 30 operates in the initial state or the reset state. At this point, the first switch 302 conducts a coupling between the power supply 102 and the oscillator 106 and the second switch 304 breaks a coupling between the LDO regulator 104 and the oscillator 106. In this situation, if intending to switch to the power supplied, a switching control signal must be inputted beforehand to turn on another power. Then, another switching control signal is inputted to shut down the power in use. For example, please refer to FIG. 4, which illustrates timing diagrams of the related signals shown in FIG. 4. Assuming that the system operates in the initial state (i.e. time T1 in FIG. 4), if the system intends to switch to the LDO regulator 104 to provide the stable voltage power $V_{REG}$ for the oscillator 106, the switching control signal S1 with the low voltage level is inputted to the first switch 302 and the switching control signal S2 with the high voltage level is inputted to the second switch 304 (i.e. time T2 in FIG. 4) in advance, such that the second switch 304 is conductive to provide the stable voltage power $V_{REG}$. Subsequently, the switching control signal S1 with the high voltage level and the switching control signal S2 with the low voltage level are inputted to the first switch 302 and the second switch 304, respectively (i.e. time T3 in FIG. 4), which allows the first switch 302 to break the coupling between the power supply 102 and the oscillator 106, and stop proving the supplying power $V_{MM}$. Consequently, the power outage mentioned above can be avoided. However, since the power switching device 30 uses two bits for controlling, the power outage may still occur if the switching control signal S1 with the high voltage level and the switching control signal S2 with the low voltage level are inputted accidentally. In addition, when the system executes a reset process, the power switching device 30 must return to the reset state as soon as possible (i.e. time T4 in FIG. 4). At this point, the control unit 306 cannot wait to closes the second switch 304 before the first switch 302 is conductive. In this situation, since the first switch 302 and the second switch 304 switch at different speeds, all supplying powers are shorted off, thereby failing to continuously provide power to the oscillator 106.

SUMMARY OF THE INVENTION

It is therefore an objective of the present invention to provide a method capable of continuously providing power, and a related apparatus and power supply system.

The present invention discloses a switching control method capable of continuously providing power for a power supply system comprising a first power unit and a second power supply unit. The switching control method includes generating a first input signal and a second input signal, performing a logical operation process on the first input signal and the second input signal to generate a first control signal, delaying the second input signal for a delay time to generate a second control signal, controlling a coupling between the first power supply unit and a load according to the first control signal and controlling a coupling between the second power supply unit and the load according to the second control signal.

The present invention further discloses a power switching device. The power switching device includes an input control unit, an operation unit, a delay unit, a first power switch, and a second power switch. The input control unit is used for generating a first input signal and a second input signal. The operation unit is coupled to a first terminal and a second terminal of the input control unit, and used for performing a logical operation process on the first input signal and the second input signal to generate a first control signal. The delay unit is coupled to the second terminal of the input control unit, and used for delaying the second input signal for a delay time to generate a second control signal. The first power switch is coupled to the operation unit, a first power supply unit and a load, and used for controlling a coupling between the first power supply unit and the load according to the first control signal. The second power switch is coupled to the delay unit, a second power supply unit and the load, and used for controlling a coupling between the second power supply unit and the load according to the second control signal.

The present invention further discloses a power supply system. The power supply system includes a first power supply unit, a second power supply unit, and a power switch device. The first power supply unit is used for proving a first voltage according to a first control signal. The second power supply unit is used for providing a second voltage according to a second control signal. The power switch device includes an input control unit, an operation unit, a delay unit, a first power switch, and a second power switch. The input control unit is used for generating a first input signal and a second input signal. The operation unit coupled to a first terminal and a second terminal of the input control unit and the first power supply unit is used for performing a logical operation process on the first input signal and the second input signal to generate a first control signal. The delay unit is coupled to the second terminal of the input control unit and the second power supply unit, and used for delaying the second input signal for a delay time to generate a second control signal. The first power switch is coupled to the operation unit, a first power supply unit and a load, and used for controlling a coupling between the first power supply unit and the load according to the first control signal to provide the first voltage to the load. The second power switch is coupled to the delay unit, the second power supply unit and the load, and used for controlling a coupling between the second power supply unit and the load according to the second control signal to provide the second voltage to the load.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
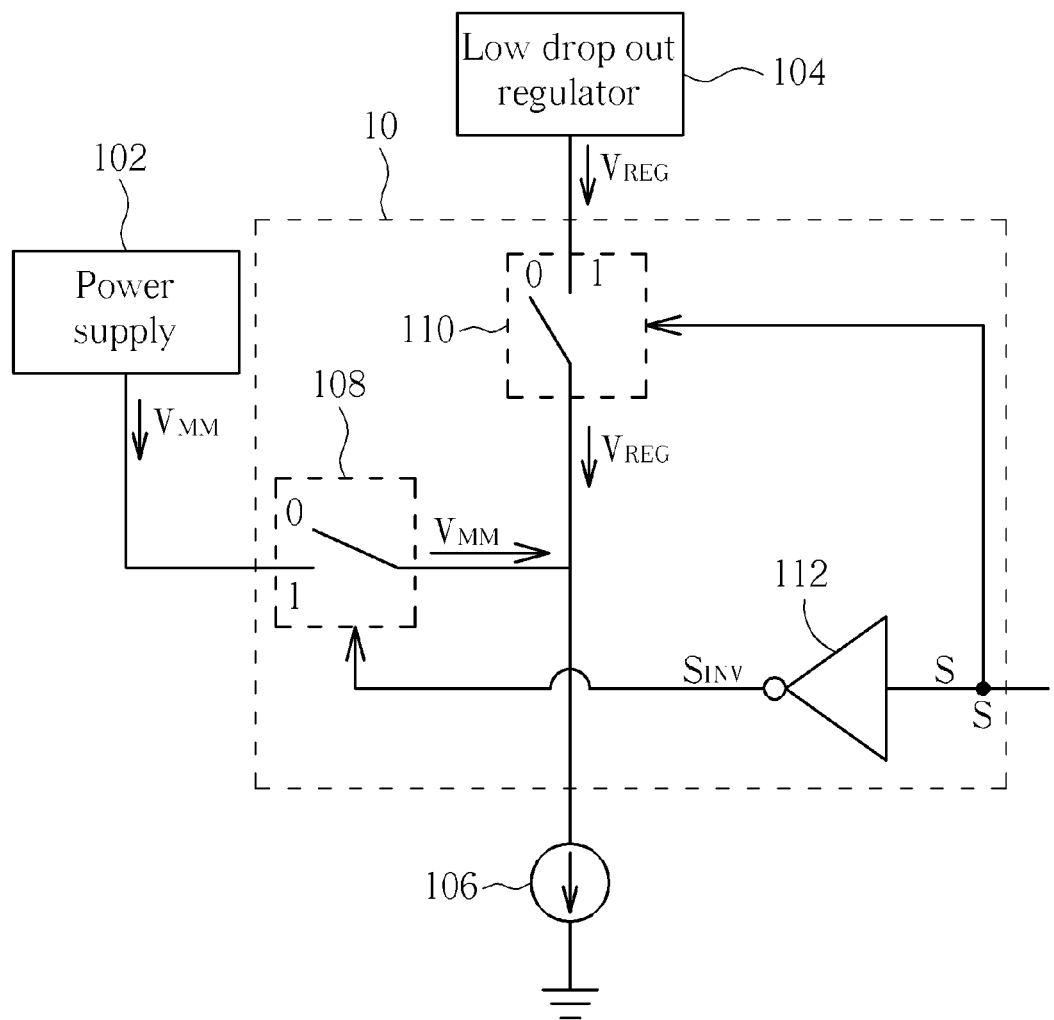
FIG. 1 is a schematic diagram of a power switching device according to the prior art.
Figure 2:
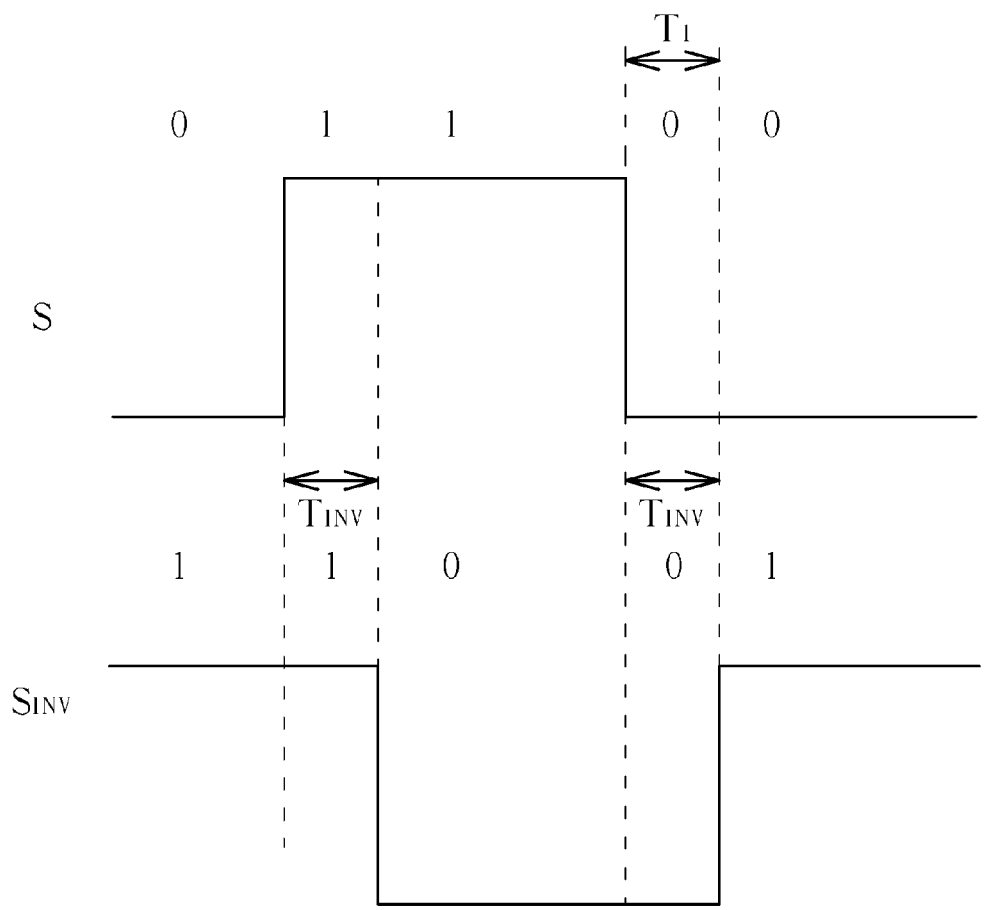
FIG. 2 illustrates timing diagrams of related signals shown in FIG. 1.
Figure 3:
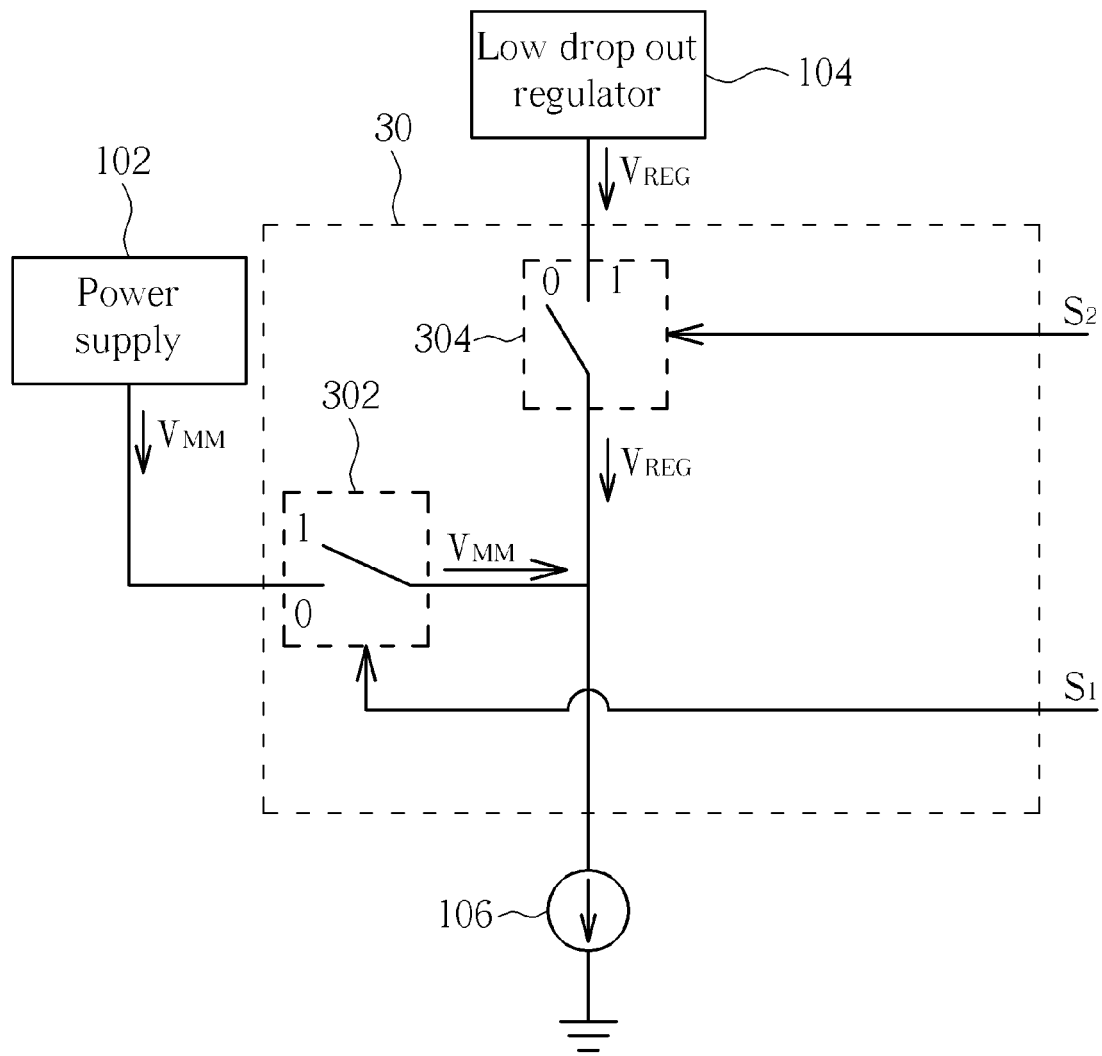
FIG. 3 is a schematic diagram of a power switching device according to the prior art.
Figure 4:
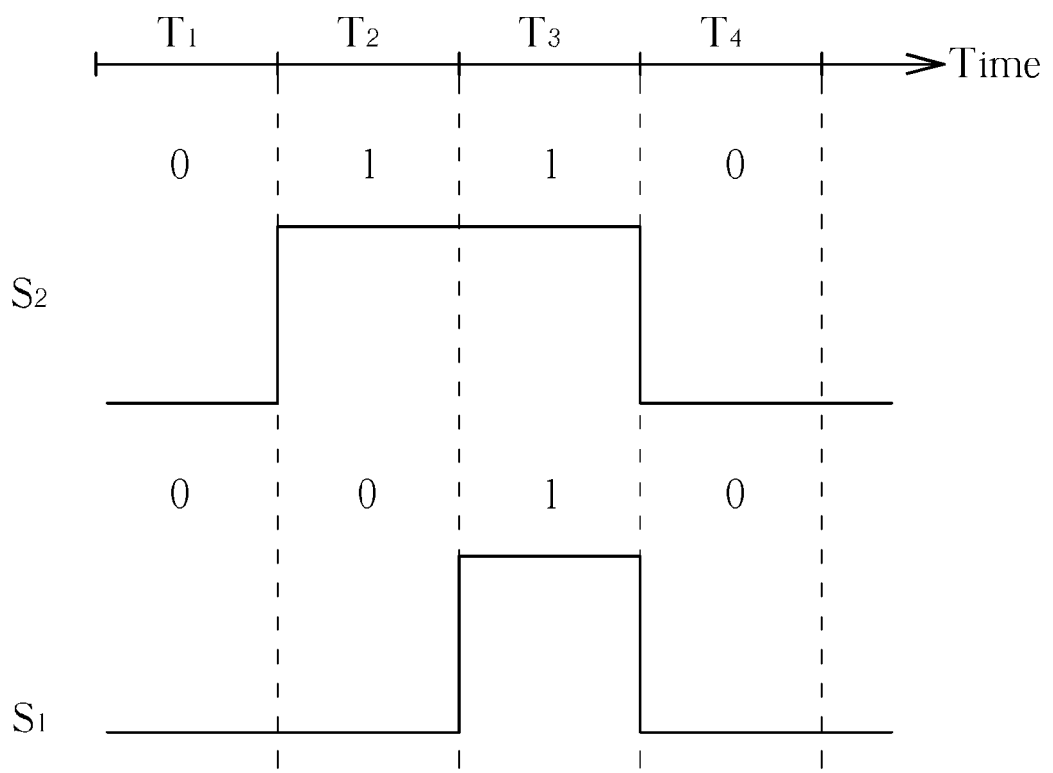
FIG. 4 illustrates timing diagrams of the related signals shown in FIG. 4.
Figure 5:
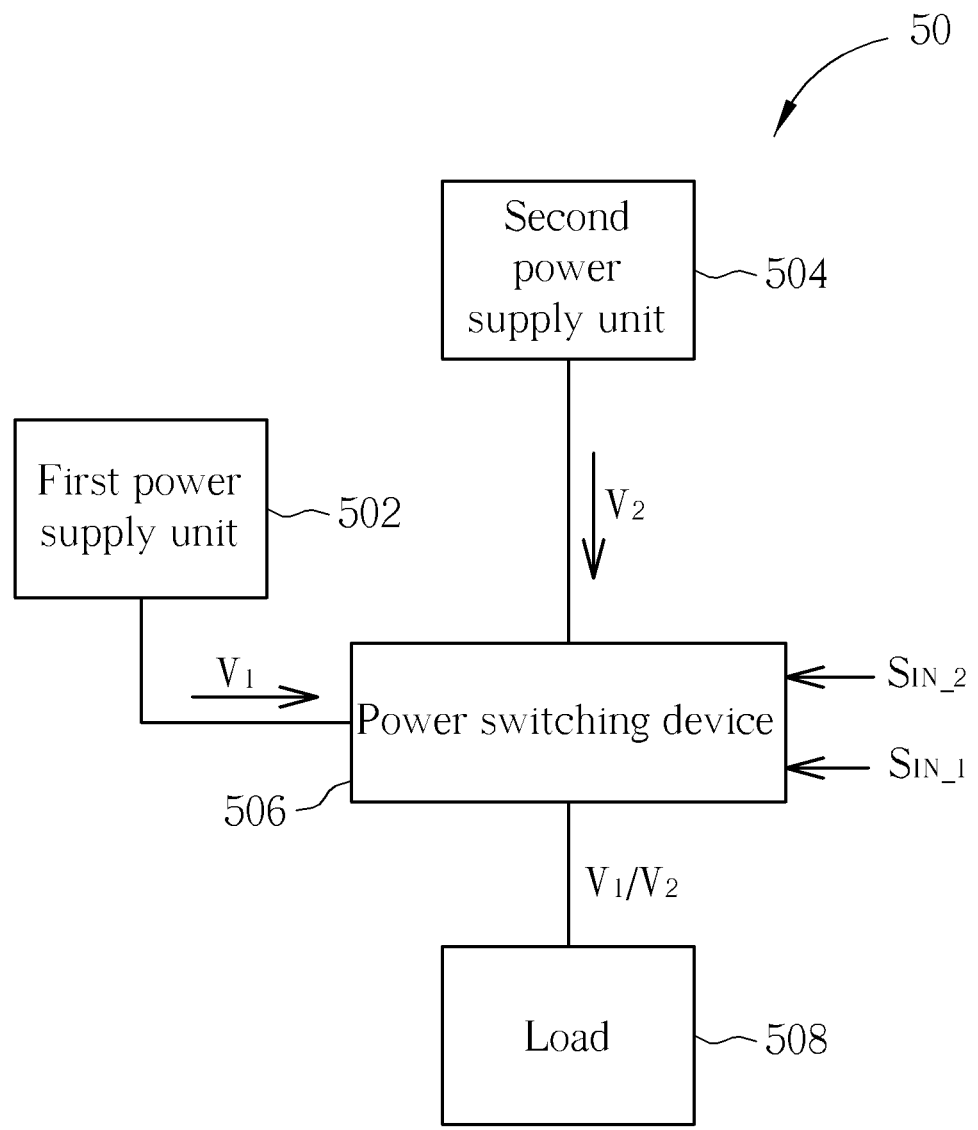
FIG. 5 is a schematic diagram of a power supply system according to an embodiment of the present invention.

Please refer to FIG. 5, which is a schematic diagram of a power supply system 50 according to an embodiment of the present invention. The power supply system 50 includes a first power supply unit 502, a second power supply unit 504, and a power switching device 506. In the power supply system 50, the first power supply unit 502 and the second power supply unit 504 are used for providing a first voltage $V_1$ and a second voltage $V_2$ to a load 508, respectively. The power switching device 506 switch powers provided to the load 508 according to a first input signal $S_{IN\_1}$ and a second input signal $S_{IN\_2}$. To take an example of an oscillator requiring a voltage of 1.8 volts, the first power supply unit 502 and the second power supply unit 504 could be a power supply and a low drop out (LDO) regulator, respectively. The load 508 could be an oscillator. When the oscillator operates in an initial state or a reset state, the first power supply unit 502 provides the first voltage $V_1$ of 1.8 volts. When the oscillator is operating, the second power supply unit 504 provides the second voltage $V_2$ of 1.8 volts with high quality and stability, based on its operational attribution. Thus, the power switching device 506 can properly switch different power supplies according to the first input signal $S_{IN\_1}$ and the second input signal $S_{IN\_2}$ to continuously provide power to the load 508.

Figure 6:
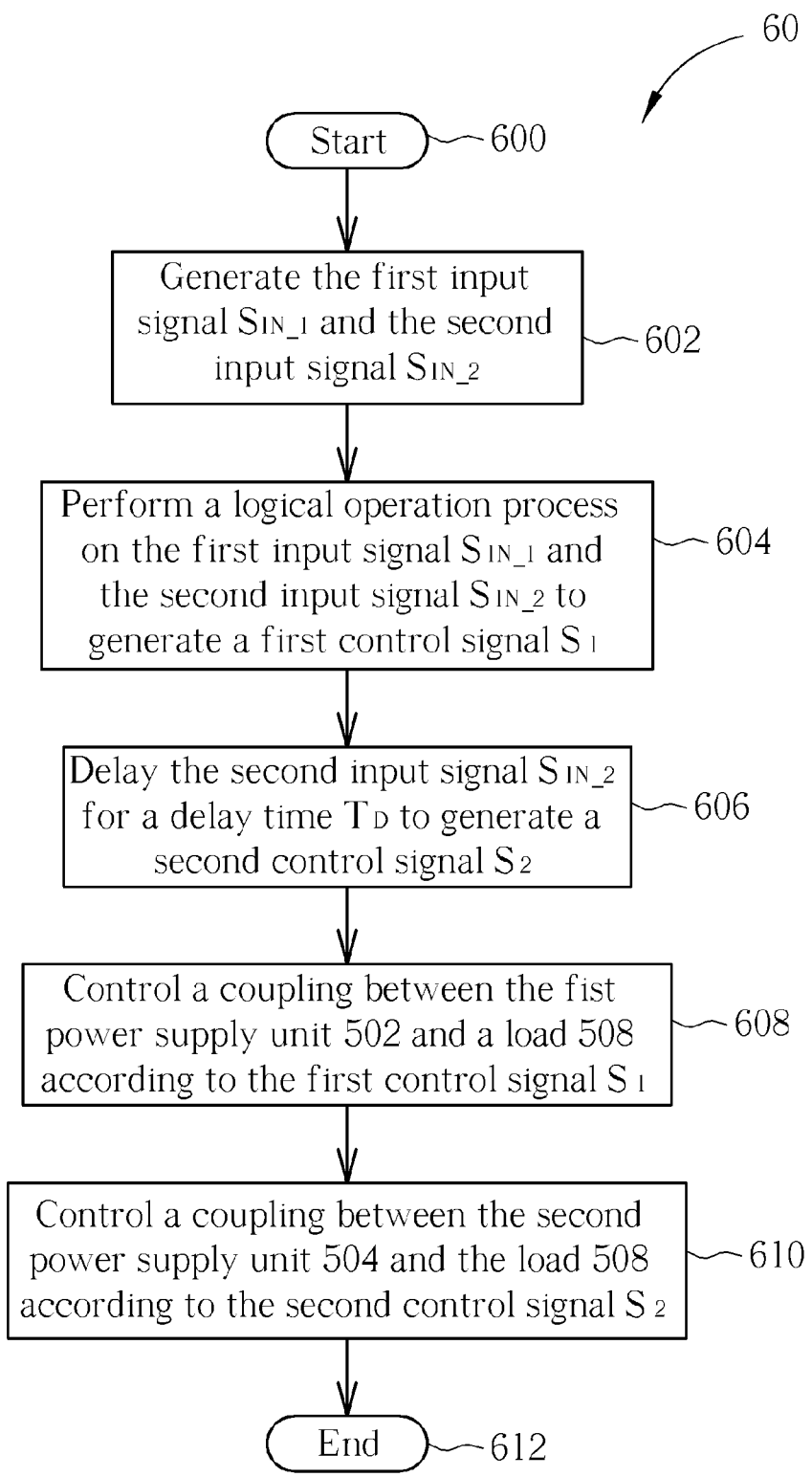
FIG. 6 is a flow chart of a power switching control process applied to the power switching device shown in FIG. 5 according to an embodiment of the present invention.

Please refer to FIG. 6, which is a flow chart of a power switching control process 60 applied to the power switching device 506 shown in FIG. 5. The power switching control process 60 is used for switching to the first power supply unit 502 or the second power supply unit 504 to provide power to the load 508. The steps are as follows:

Step 600: Start.

Step 602: Generate the first input signal $S_{IN\_1}$ and the second input signal $S_{IN\_2}$.

Step 604: Perform a logical operation process on the first input signal $S_{IN\_1}$ and the second input signal $S_{IN\_2}$ to generate a first control signal $S_1$.

Step 606: Delay the second input signal $S_{IN\_2}$ for a delay time $T_D$ to generate a second control signal $S_2$.

Step 608: Control a coupling between the fist power supply unit 502 and a load 508 according to the first control signal $S_1$.

Step 610: Control a coupling between the second power supply unit 504 and the load 508 according to the second control signal $S_2$.

Step 612: End.

According to the power switching control process 60, the power switching device 506 performs a specific logical operation process on the first input signal $S_{IN\_1}$ and the second input signal $S_{IN\_2}$ to generate the first control signal $S_1$, and the power switching device 506 delays the second input signal to generate the second control signal $S_2$. The power switching device 506 controls the coupling between the first power supply unit 502 and the load 508 and the coupling between the second power supply unit 504 and the load 508 according to the first control signal $S_1$ and the second control signal $S_2$, respectively. In other words, according to the first input signal $S_{IN\_1}$ and the second input signal $S_{IN\_2}$, the power switching device 506 controls whether the coupling between the first power supply unit 502 and the load 508 is conductive or the coupling between the second power supply unit 504 is conductive, in order to switch power provided for the load 508. Consequently, the power supply system 50 can provide a proper power to the load 508 according to a different power usage stage as well as continuously provide power to the load 508.

Figure 7:
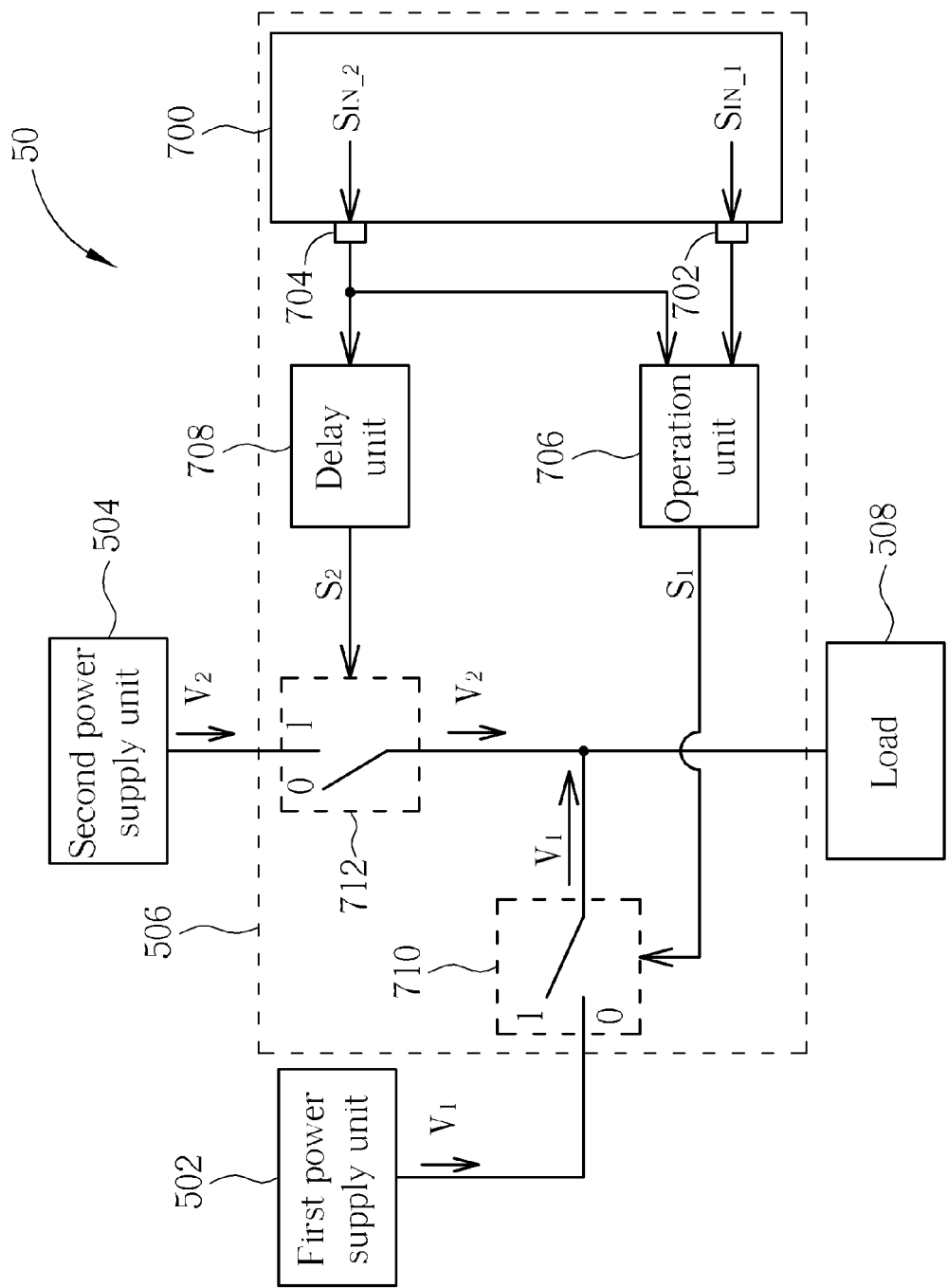
FIG. 7 is a schematic diagram of the power switching device shown FIG. 5.

Further, the implementation of the power switching device 506 can be known by referring to FIG. 7. As shown in FIG. 7, the power switching control device 506 includes an input control unit 700, an operation unit 706, a delay unit 708, a first power switch 710 and the second power switch 712. The input control unit 700 is used for generating the first input signal $S_{IN\_1}$ and the second input signal $S_{IN\_2}$. A first terminal 702 and a second terminal 704 of the input control unit 700 output the first control signal $S_{IN\_1}$ and the second control signal $S_{IN\_2}$, respectively. The operation unit 706 is coupled to the first terminal 702 and the second terminal 704 of the input control unit 700, and used for performing a logical operation process on the first input signal $S_{IN\_1}$ and the second input signal $S_{IN\_2}$ to generate a first control signal $S_1$. The delay unit 708 is coupled to the second terminal 704, and used for delaying the second input signal $S_{IN\_2}$ for a delay time $T_D$ to generate the second control signal $S_2$. The first power switch 710 is coupled to the operation unit 706, the first power supply unit 502 and the load 508, and used for controlling the coupling between the first power supply unit 502 and the load 508 according to the first control signal $S_1$. The second power switch 712 is coupled to the delay unit 708, the second power supply unit 504 and the load 508, and used for controlling the coupling between the second power supply unit 504 and the load 508 according to the second control signal $S_2$. Preferably, when the first input signal $S_{IN\_1}$ and the second input signal $S_{IN\_2}$ are low, the power supply system operates in the initial state or the reset state.

Figure 8:
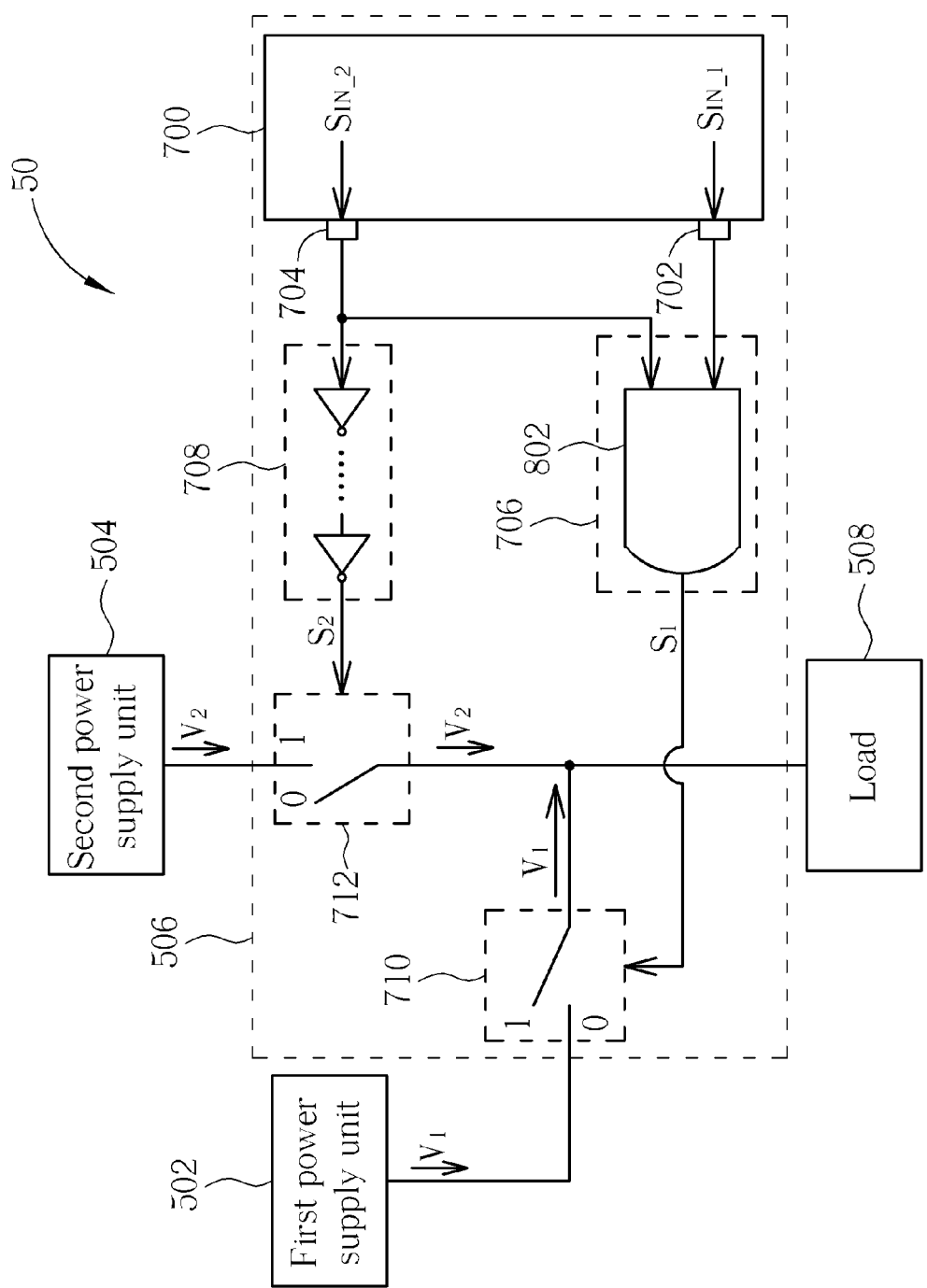
FIG. 8 is another schematic diagram of the power switching device shown in FIG. 5

In the power switching device 506, the operation unit 706 can implement an AND logical operation process, using an AND gate 802. For example, please refer to FIG. 8, which is a schematic diagram of the power switching device 506 shown in FIG. 5 according to another embodiment of the present invention. As shown in FIG. 8, the first power switch 710 breaks the coupling between the first power supply unit 502 and the load 508 when the first control signal $S_1$ is high. The first power switch 710 conducts the coupling between the first power supply unit 502 and the load 508 when the first control signal $S_1$ is low. In other words, the first power supply unit 502 can provide a first voltage $V_1$ to the load 508 when the first control signal $S_1$ is low. When the first control signal $S_1$ is high, the first power supply unit 502 stops supplying power. Similarly, the second power switch 712 conducts the coupling between the second power supply unit 504 and the load 508 when the second control signal $S_2$ is high. The second power switch 712 breaks the coupling between the second power supply unit 504 and the load 508 when the second control signal $S_2$ is low. In this situation, since the operation unit 706 uses the AND logical operation process and the first control signal $S_1$ is controlled by the first input signal $S_{IN\_1}$ and the second input signal $S_{IN\_2}$, all supplying powers do not simultaneously shut down no matter how the first input signal $S_{IN\_1}$ and the second input signal $S_{IN\_2}$ alter. Namely, for the load 508, its power supply will not be floating. Please refer to FIG. 9, which illustrates timing diagrams of related signals shown in FIG. 8. When the system executes the reset process, the first input signal $S_{IN\_1}$ with the low voltage level and the second input signal $S_{IN\_2}$ with the low voltage level are inputted (i.e. $S_{IN\_1}=0$, $S_{IN\_2}=0$). This makes the power switching device 506 return to the reset state immediately (i.e. time $T_4$ shown in FIG. 9). Compared with the short power outage during the reset process in the prior art, because the delay unit 708 delays the second input signal $S_{IN\_2}$ for a delay time $T_D$ to generate the second control signal $S_2$ (delay time $T_D$ is longer than the operation time of the operation unit 706), the power switching device 506 of the present invention outputs the second control signal $S_2$ to the second power switch 712 for closing the output of the second power switch. Consequently, the first power switch 710 already conducts the coupling between the first power supply unit 502 and the load 508 according to the first control signal $S_1$, proving the first voltage $V_1$ before the second control signal $S_2$ is sent to the second power switch 712. In other words, through the power switching device 506 of the present invention, the short power outage caused by the reset process can be avoided.

Figure 9:
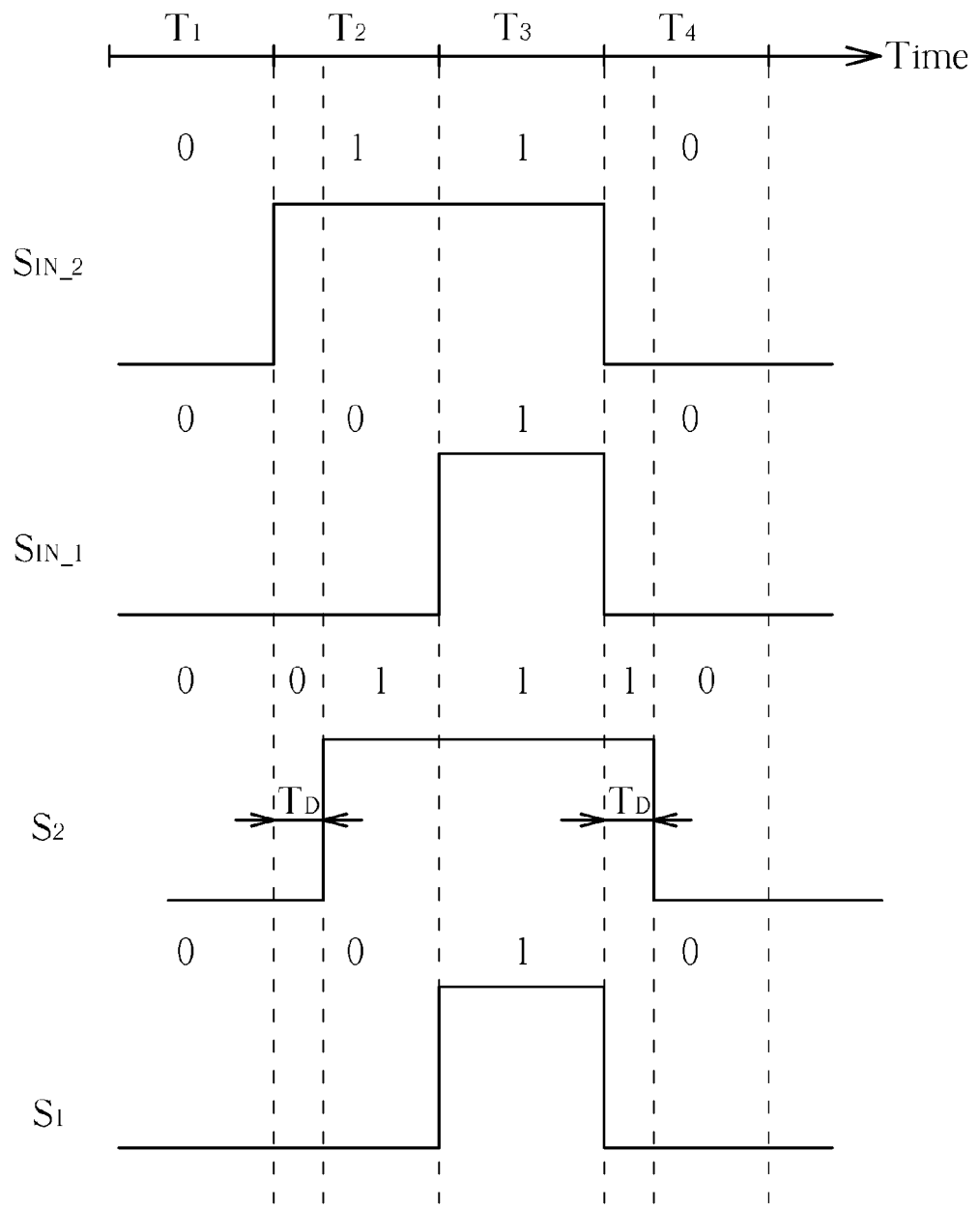
FIG. 9 illustrates timing diagrams of related signals shown in FIG. 8.

Please continue to refer to FIG. 8 and FIG. 9. When the power switching device 506 is operating, if power provided is fully switched from the first power supply unit 502 to the second power supply unit 504, namely, the first control signal $S_1$ goes from low to high and the second control signal S2 goes from low to high, it is necessary for the input control unit 700 to generate the first input signal $S_{IN\_1}$ with the low voltage level and the second input signal $S_{IN\_2}$ with the high voltage level (i.e. $S_{IN\_1}=1$, $S_{IN\_2}=1$). This switches the second power switch 712 to be conductive after the second power supply unit 504 stops providing the first voltage $V_2$ (i.e. time T3 shown in FIG. 9). As a result, short power outage of all power supplies caused by each switch switching at a different switching speed can be avoided.

Figure 10:
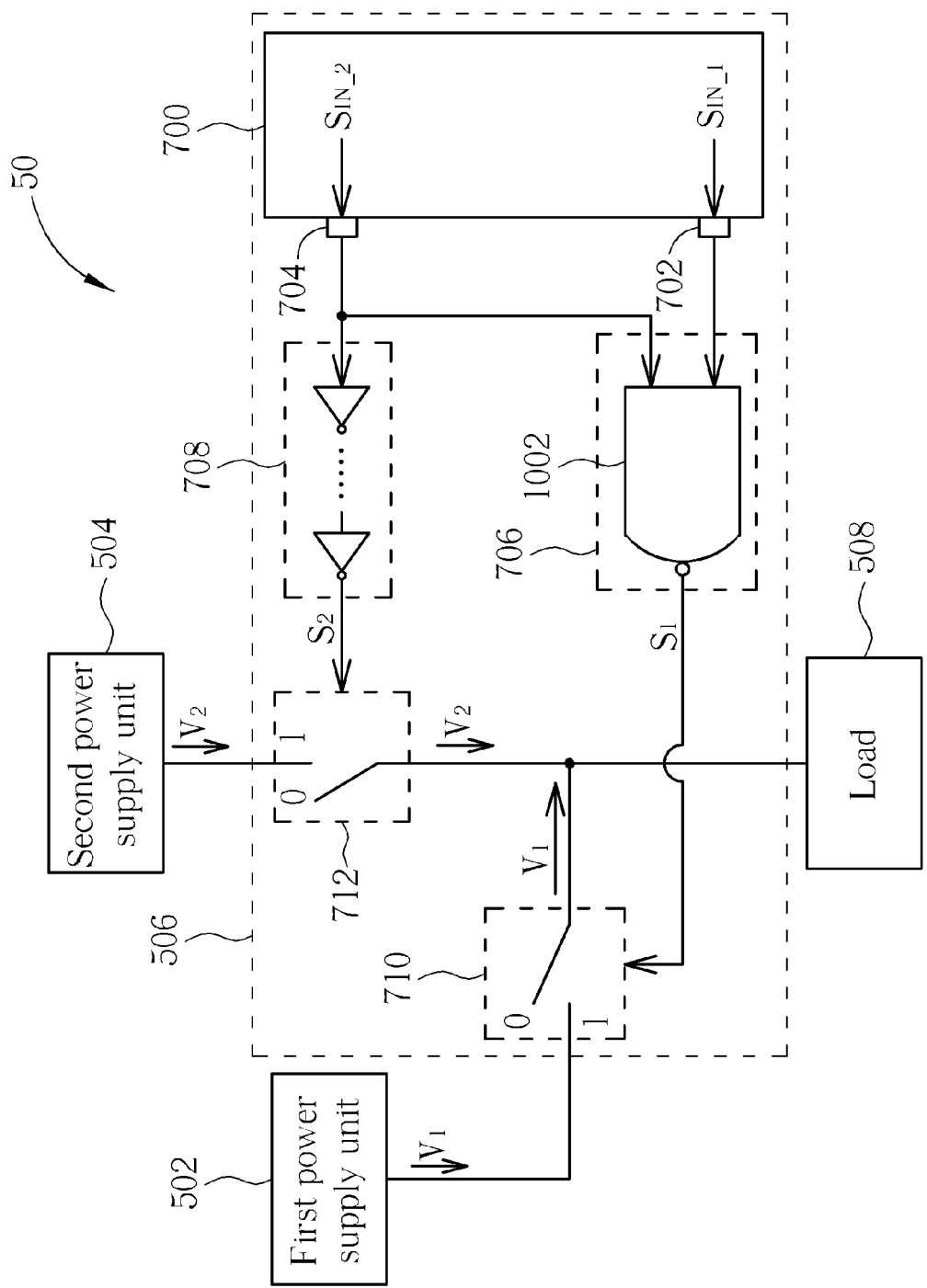
FIG. 10 is another schematic diagram of the power switching device shown in FIG. 5.

Alternatively, the operation unit 706 could implement a NAND logical operation process, using a NAND gate 1002. For an example of this, please refer to FIG. 10, which is a schematic diagram of the power switching device 506 shown in FIG. 5 according to another embodiment of the present invention. Please note that the components designated with the same title in the power switching device 506 in FIG. 10 and the power switching device 506 in FIG. 8 have similar functions and operations. For simplicity in the specification, the detailed description is omitted herein. Those coupling relationships shown in FIG. 10 are also not elaborated on herein. In FIG. 10, the first power switch 710 conducts the coupling between the first power supply unit 502 and the load 508 when the first control signal $S_1$ is high. The first power switch 710 breaks the coupling between the first power supply unit 502 and the load 508 when the first control signal $S_1$ is low. Likewise, the second power switch 712 conducts the coupling between the second power supply unit 504 and the load 508 when the second control signal $S_2$ is high and breaks the coupling between the second power supply unit 504 and the load 508 when the second control signal $S_2$ is low.

Please note that the power switch device 506 is just one embodiment of the present invention. Those skilled in the art can modify the design of the present invention based on their particular requirements. The delay unit 708 can be implemented by any device with a delay function, for example, an even number of inverters connected in series. The first power supply unit 502 and the second power supply unit 504 could be any type of power supply, depending on requirements of the system designer. The load 508 could be any device in need of power supply, such as an oscillator, an amplifier and etc, but is not limited herein. In addition, the aforementioned delay time $T_D$ must be longer than the operation time of the operation unit 706.

To sum up, through the power switching device of the present invention, the power supplies can be flexibly switched, to avoid power outage and continuously provide power.

Those skilled in the art will readily observe that numerous modifications and alterations of the device and method may be made while retaining the teachings of the invention.

What is claimed is:

1. A switching control method capable of continuously providing power for a power supply system comprising a first power supply unit and a second power supply unit, the switching control method comprising:
   generating a first input signal for an operation unit and generating a second input signal for the operation unit and a delay unit;
   utilizing the operation unit to perform an AND logical operation process on the received first input signal and the received second input signal to generate a first control signal;
   utilizing the delay unit to delay the received second input signal for a delay time to generate a second control signal;
   during transition from the first power supply unit to the second power supply unit, conducting a coupling between the first power supply unit and a load at first according to the first control signal, and conducting a coupling between the second power supply unit and the load according to the second control signal after the delay time, when the first input signal is at a first level and the second input signal goes from the first level to a second level; and
   during transition from the second power supply unit to the first power supply unit, conducting the coupling between the first power supply unit and the load according to the first control signal, and conducting the coupling between the second power supply unit and the load for the delay time according to the second control signal, when the first input signal goes from the second level to the first level and the second input signal goes from the second level to the first level.

2. The switching control method of claim 1, further comprising:
   conducting the coupling between the first power supply unit and the load when the first control signal is at the first level and breaking the coupling between the first power supply unit and the load when the first control signal is at the second level.

3. The switching control method of claim 1, further comprising:
   conducting the coupling between the second power supply unit and the load when the second control signal is at the second level and breaking the coupling between the second power supply unit and the load when the second control signal is at the first level.

4. The witching control method of claim 1, further comprising:
   during transition from the first power supply unit to the second power supply unit, breaking the coupling between the first power supply unit and the load according to the second control signal, when the first input signal goes from the first level to the second level and the second input signal is at the second level.

5. The witching control method of claim 1, further comprising:
   during transition from the second power supply unit to the first power supply unit, breaking the coupling between the second power supply unit and the load after the delay time according to the second control signal, when the first input signal goes from the second level to the first level and the second input signal goes from the second level to the first level.

6. A switching control method capable of continuously providing power for a power supply system comprising a first power supply unit and a second power supply unit, the switching control method comprising:
   generating a first input signal for an operation unit and generating a second input signal for the operation unit and a delay unit;
   utilizing the operation unit to perform a NAND logical operation process on the received first input signal and the received second input signal to generate a first control signal;
   utilizing the delay unit to delay the received second input signal for a delay time to generate a second control signal;
   during transition from the first power supply unit to the second power supply unit, conducting a coupling between the first power supply unit and a load at first according to the first control signal, and conducting a coupling between the second power supply unit and the load according to the second control signal after the delay time, when the first input signal is at a first level and the second input signal goes from the first level to a second level; and
   during transition from the second power supply unit to the first power supply unit, conducting the coupling between the first power supply unit and the load according to the first control signal, and conducting the coupling between the second power supply unit and the load for the delay time according to the second control signal, when the first input signal is at the first level and the second input signal goes from the second level to the first level.

7. The switching control method of claim 6, further comprising:
   conducting the coupling between the first power supply unit and the load when the first control signal is at the second level.

8. The switching control method of claim 6, further comprising:

breaking the coupling between the first power supply unit and the load when the first control signal is at the first level.

9. The switching control method of claim 6, further comprising:
conducting the coupling between the second power supply unit and the load when the second control signal is at the second level.

10. The switching control method of claim 6, further comprising:
breaking the coupling between the second power supply and the load when the second control signal is at the first level.

11. The switching control method of claim 6 further comprising:
during transition from the first power supply unit to the second power supply unit, breaking the coupling between the first power supply unit and the load according to the second control signal, when the first input signal goes from the first level to the second level and the second input signal is at the second level.

12. The switching control method of claim 6, further comprising:
during transition from the second power supply unit to the first power supply unit, breaking the coupling between the second power supply unit and the load after the delay time according to the second control signal, when the first input signal is at first level and the second input signal goes from the second level to the first level.

13. A power switching device comprising:
an input control unit, for generating a first input signal and a second input signal;
an operation unit coupled to a first terminal and a second terminal of the input control unit, for receiving the first input signal and the second input signal via the first terminal and the second terminal of the input control unit, and performing an AND logical operation process on the received first input signal and the received second input signal to generate a first control signal;
a delay unit coupled to the second terminal of the input control unit, for receiving the second input signal via the second terminal of the input control unit, and delaying the received second input signal for a delay time to generate a second control signal;
a first power switch coupled to the operation unit, a first power supply unit and a load, for controlling a coupling between the first power supply unit and the load according to the first control signal; and
a second power switch coupled to the delay unit, a second power supply unit and the load, for controlling a coupling between the second power supply unit and the load according to the second control signal, wherein during transition from the first power supply unit to the second power supply unit, the first power switch conducts the coupling between the first power supply unit and the load at first according to the first control signal, and the second power switch conducts the coupling between the second power supply unit and the load according to the second control signal after the delay time, when the first input signal is at a first level and the second input signal goes from the first level to a second level;
wherein during transition from the second power supply unit to the first power supply unit, the first power switch conducts the coupling between the first power supply unit and the load according to the first control signal, and the second power switch conducts the coupling between the second power supply unit and the load according to the second control signal for the delay time, when the first input signal goes from the second level to the first level and the second input signal goes from the second level to the first level.

14. The power switching device of claim 13, wherein the fist power switch conducts the coupling between the first power supply unit and the load when the first control signal is at the first level and breaks the coupling between the first power supply unit and the load when the first control signal is at the second level.

15. The power switching device of claim 13, wherein the second power switch conducts the coupling between the second power supply unit and the load when the second control signal is at the second level and breaks the coupling between the second power supply unit and the load when the second control signal is at the first level.

16. The power switching device of claim 13, wherein during transition from the first power supply unit to the second power supply unit, the first power switch breaks the coupling between the first power supply unit and the load according to the second control signal, when the first input signal goes from the first level to the second level and the second input signal is at the second level.

17. The power switching device of claim 13, wherein the delay unit is an even number of inverters connected in series.

18. The power switching device of claim 13, wherein during transition from the second power supply unit to the first power supply unit, the second power switch breaks the coupling between the second power supply unit and the load after the delay time according to the second control signal, when the first input signal is at first level and the second input signal goes from the second level to the first level.

19. A power switching device comprising:
an input control unit, for generating a first input signal and a second input signal;
an operation unit coupled to a first terminal and a second terminal of the input control unit, for receiving the first input signal and the second input signal via the first terminal and the second terminal of the input control unit, and performing a NAND logical operation process on the received first input signal and the received second input signal to generate a first control signal;
a delay unit coupled to the second terminal of the input control unit, for receiving the second input signal via the second terminal of the input control unit, and delaying the received second input signal for a delay time to generate a second control signal;
a first power switch coupled to the operation unit, a first power supply unit and a load, for controlling a coupling between the first power supply unit and the load according to the first control signal; and
a second power switch coupled to the delay unit, a second power supply unit and the load, for controlling a coupling between the second power supply unit and the load according to the second control signal, wherein during transition from the first power supply unit to the second power supply unit, the first power switch conducts the coupling between the first power supply unit and the load at first according to the first control signal, and the second power switch conducts the coupling between the second power supply unit and the load according to the second control signal after the delay time, when the first input signal is at a first level and the second input signal goes from the first level to a second level;
wherein during transition from the second power supply unit to the first power supply unit, the first power switch conducts the coupling between the first power supply unit and the load according to the first control signal, and the second power switch conducts the coupling between the second power supply unit and the load for the delay time according to the second control signal, when the first input signal is at the first level and the second input signal goes from the second level to the first level.

20. The power switching device of claim 19, wherein the first power switch conducts the coupling between the first power supply unit and the load when the first control signal is at the second level.

21. The power switching device of claim 19, wherein the first power switch breaks the coupling between the first power supply unit and the load when the first control signal is at the first level.

22. The power switching device of claim 19, wherein the second power switch conducts the coupling between the second power supply unit and the load when the second control signal is at the second level.

23. The power switching device of claim 19, wherein the second power switch breaks the coupling between the second power supply unit and the load when the second control signal is at the first level.

24. The power switching device of claim 19, wherein during transition from the first power supply unit to the second power supply unit, the first power switch breaks the coupling between the first power supply unit and the load according to the second control signal, when the first input signal goes from the first level to the second level and the second input signal is at the second level.

25. The power switching device of claim 19, wherein the delay unit is an even number of inverters connected in series.

26. The power switching device of claim 19, wherein during transition from the second power supply unit to the first power supply unit, the second power switch breaks the coupling between the second power supply unit and the load after the delay time according to the second control signal, when the first input signal is at first level and the second input signal goes from the second level to the first level.

27. A power supply system comprising:
a first power supply unit, for proving a first voltage according to a first control signal;
a second power supply unit, for providing a second voltage according to a second control signal; and
a power switch device comprising:
an input control unit, for generating a first input signal and a second input signal;
an operation unit coupled to a first terminal and a second terminal of the input control unit and the first power supply unit, for receiving the first input signal and the second input signal via the first terminal and the second terminal of the input control unit, and performing an AND logical operation process on the received first input signal and the received second input signal to generate a first control signal;
a delay unit coupled to the second terminal of the input control unit and the second power supply unit, for receiving the second input signal via the second terminal of the input control unit, and delaying the received second input signal for a delay time to generate a second control signal;
a first power switch coupled to the operation unit, a first power supply unit and a load, for controlling a coupling between the first power supply unit and the load according to the first control signal to provide the first voltage to the load; and
a second power switch coupled to the delay unit, the second power supply unit and the load, for controlling a coupling between the second power supply unit and the load according to the second control signal to provide the second voltage to the load, wherein during transition from the first power supply unit to the second power supply unit, the first power switch conducts the coupling between the first power supply unit and the load at first according to the first control signal, and the second power switch conducts the coupling between the second power supply unit and the load according to the second control signal after the delay time, when the first input signal is at a first level and the second input signal goes from the first level to a second level;
wherein during transition from the second power supply unit to the first power supply unit, the first power switch conducts the coupling between the first power supply unit and the load according to the first control signal, and the second power switch conducts the coupling between the second power supply unit and the load according to the second control signal for the delay time, when the first input signal goes from the second level to the first level and the second input signal goes from the second level to the first level.

28. The power supply system of claim 27, wherein during transition from the first power supply unit to the second power supply unit, the first power switch breaks the coupling between the first power supply unit and the load according to the second control signal, when the first input signal goes from the first level to the second level and the second input signal is at the second level.

29. The power supply system of claim 27, wherein during transition from the second power supply unit to the first power supply unit, the second power switch breaks the coupling between the second power supply unit and the load after the delay time according to the second control signal, when the first input signal is at first level and the second input signal goes from the second level to the first level.

30. The power supply system of claim 27, wherein the first power switch conducts the coupling between the first power supply unit and the load when the first control signal is at the first level and breaks the coupling between the first power supply unit and the load when the first control signal is at the second level.

31. The power supply system of claim 27, wherein the second power switch conducts the coupling between the second power supply unit and the load when the second control signal is at the second level and breaks the coupling between the second power supply unit and the load when the second control signal is at the first level.

32. A power supply system, comprising:
a first power supply unit, for proving a first voltage according to a first control signal;
a second power supply unit, for providing a second voltage according to a second control signal; and
a power switch device comprising:
an input control unit, for generating a first input signal and a second input signal;
an operation unit coupled to a first terminal and a second terminal of the input control unit, for receiving the first input signal and the second input signal via the first terminal and the second terminal of the input control unit, and performing an NAND logical operation process on the received first input signal and the received second input signal to generate the first control signal;
a delay unit coupled to the second terminal of the input control unit, for receiving the second input signal via the second terminal of the input control unit, and delaying the received second input signal for a delay time to generate the second control signal;

a first power switch coupled to the operation unit, a first power supply unit and a load, for controlling a coupling between the first power supply unit and the load according to the first control signal; and a second power switch coupled to the delay unit, a second power supply unit and the load, for controlling a coupling between the second power supply unit and the load according to the second control signal, wherein during transition from the first power supply unit to the second power supply unit, the first power switch conducts the coupling between the first power supply unit and the load at first according to the first control signal, and the second power switch conducts the coupling between the second power supply unit and the load according to the second control signal after the delay time, when the first input signal is at a first level and the second input signal goes from the first level to a second level;

wherein during transition from the second power supply unit to the first power supply unit, the first power switch conducts the coupling between the first power supply unit and the load according to the first control signal, and the second power switch conducts the to coupling between the second power supply unit and the load for the delay time according to the second control signal, when the first input signal is at the first level and the second input signal goes from the second level to the first level.

33. The power supply system of claim 32, wherein the first power switch conducts the coupling between the first power supply unit and the load when the first control signal is at the second level.

34. The power supply system of claim 32, wherein the first power switch breaks the coupling between the first power supply unit and the load when the first control signal is at the first level.

35. The power supply system of claim 32, wherein the second power switch conducts the coupling between the second power supply unit and the load when the second control signal is at the second level.

36. The power supply system of claim 32, wherein the second power switch breaks the coupling between the second power supply unit and the load when the second control signal is at the first level.

37. The power supply system of claim 32, wherein during transition from the first power supply unit to the second power supply unit, the first power switch breaks the coupling between the first power supply unit and the load according to the second control signal, when the first input signal goes from the first level to the second level and the second input signal is at the second level.

38. The power supply system of claim 32, wherein during transition from the second power supply unit to the first power supply unit, the second power switch breaks the coupling between the second power supply unit and the load after the delay time according to the second control signal, when the first input signal is at first level and the second input signal goes from the second level to the first level.

* * * * *